United States Patent [19]

Fantone

[11] Patent Number: 5,450,244
[45] Date of Patent: * Sep. 12, 1995

[54] CYLINDRICAL FIBER COUPLING LENS WITH BIASPHERIC SURFACES

[75] Inventor: Stephen D. Fantone, Lynnfield, Mass.

[73] Assignee: Polaroid Corporation, Cambridge, Mass.

[ * ] Notice: The portion of the term of this patent subsequent to Dec. 7, 2010 has been disclaimed.

[21] Appl. No.: 993,653

[22] Filed: Dec. 18, 1992

[51] Int. Cl.⁶ .............................................. G02B 13/18
[52] U.S. Cl. ..................................... 359/710; 359/719
[58] Field of Search ............... 359/710, 708, 711, 712, 359/718, 719

[56] References Cited

U.S. PATENT DOCUMENTS

| | | | |
|---|---|---|---|
| 4,530,574 | 7/1985 | Scifres et al. | 350/420 |
| 4,675,531 | 6/1987 | Clark et al. | 250/568 |
| 4,826,269 | 5/1989 | Streifer et al. | 350/3.72 |
| 4,964,704 | 10/1990 | Shinohara | 350/433 |
| 4,972,427 | 11/1990 | Streifer et al. | 372/92 |
| 4,979,807 | 12/1990 | Matsuoka | 350/432 |
| 5,004,330 | 4/1991 | Ishibai et al. | 350/432 |
| 5,020,888 | 6/1991 | Ishibai et al. | 350/432 |
| 5,081,639 | 1/1992 | Snyder et al. | 372/101 |
| 5,127,068 | 6/1992 | Baer et al. | 385/34 |
| 5,268,978 | 12/1993 | Po et al. | 385/119 |
| 5,293,269 | 3/1994 | Burkhart et al. | 359/710 |

OTHER PUBLICATIONS

IBM Technical Disclosure Bulletin, vol. 19, No. 2, Jul. 1976, "Collimated Light Source With Laser Diode and Microcylindrical Lens," E. A. Cunningham.

Primary Examiner—Scott J. Sugarman
Attorney, Agent, or Firm—Francis J. Caufield

[57] ABSTRACT

A cylindrical lens for coupling light from a line of emitting facets of laser diodes to a line of entrance faces of respective fiber waveguides. The lens is biaspheric, i.e., it includes two aspheric refractive surfaces which, in planes transverse to the lens axis, have (curvatures that are other than of a conic in cross-section. The surfaces are shaped to correct for spherical aberrations, coma, and other off-axis aberrations. A system places the lens to image the emitting facets of the laser diode line onto the entrance facets of the fiber waveguides so that coupling efficiency between the two is relatively insensitive to lateral misalignment.

12 Claims, 8 Drawing Sheets

CYLINDRICAL FIBER COUPLING LENS WITH BIASPHERIC SURFACES

CROSS-REFERENCE TO RELATED APPLICATIONS

This application is related to the concurrently filed and commonly assigned application of Hong Po and Stephen D. Fantone entitled "Optical Fiber Laser and Geometric Coupler" Ser. No. 07/994, 412, now U.S. Pat. No. 5,268,978.

BACKGROUND OF THE INVENTION

1. Field of the Invention

This invention relates to laser systems in which cylindrical lenses couple the outputs of laser diodes into optical fiber waveguides to provide pump light for lasing action in laser cavities and particularly to cylindrical lenses for coupling light from laser diode arrays into optical fiber waveguides.

2. Background of the Prior Art

Various means have been used to couple light from arrays of aligned laser diode stripes into optical fiber waveguide ends for the purpose of pumping solid state lasers. U.S. Pat. Nos. 4,818,062, 4,479,224, 4,383,318, and 4,911,526 disclose butt coupling light from laser diode arrays into optical fiber waveguide ends by placing the emitting faces of the laser diodes as close as possible to the entrance faces of the optical fiber waveguides. However, butt coupling makes it difficult to achieve high coupling efficiency because of the large angular divergences of laser diode stripes, at least in one azimuth, compared with the numerical aperture of the optical fiber waveguide in the same azimuth. Efficient coupling in these circumstances also requires critical close spacing and alignment of the members and/or fiber cladding having very low refractive indices. The close spacing also risks damage to the members.

U.S. Pat. No. 4,972,427 discloses coupling of laser diodes in a laser bar into a slab of a Talbot cavity using a lenticular array aligned with the diodes and a cylindrical lens behind the lenticular array. This passes light into the slab but apparently does not simplify attainment of greater efficiencies.

U.S. Pat. No. 5,127,068 discloses coupling the output of laser diodes into optical fiber waveguides by collimating the output emissions of the laser diodes with a cylindrical optical fiber having a diameter roughly equal to the diameter of the optical fiber waveguides to be coupled to and preferably 20% to 50% larger than the lateral dimension of the laser diode emitter regions. The patent discloses spacing the optical fiber end from the microlens as closely as possible and also suggests that cross-sections such as elliptical and hyperbolic could be useful for correction of particular spherical aberrations.

However, no matter how close one places such fiber waveguides to such a collimating lens, off axis rays may still fall outside the acceptance angle of the fiber waveguides. Moreover, cylindrical fiber lenses with round or other conic cross-sections may correct well on-axis but quickly degrade off-axis. This affects coupling efficiency adversely.

U.S. Pat. No. 4,826,269 discloses focusing diode lasers onto a single region by circularly disposing a number of vertical and horizontal cylindrical lenses. The complexity of such a device makes it unsuitable for many applications.

U.S. Pat. No. 5,081,639 discloses a method of making a cylindrical microlens which produces focused, defocused, or collimated exiting light and having circular, elliptical, and hyperbolic cross-sectional shapes. Such lenses are also well-corrected on-axis but rapidly degrade off-axis. Thus, they have limited ability to couple light simply and efficiently from laser diodes into fiber waveguides.

Furthermore, such small-fiber cylindrical lenses tend to sag. This makes it difficult to align them with the diodes and the optical fiber ends.

An object of this invention is to avoid these disadvantages.

Another object is to improve laser systems.

Another object of the invention is to improve coupling of light from laser diodes to optical fiber waveguides.

Yet another object of the invention is to furnish cylindrical lenses for efficient coupling of light from laser diodes into optical fiber waveguides.

Still another object of the invention is to improve manufacturing methods and means for such cylindrical lenses.

Yet another object of the invention is to improve systems for generating light for pumping solid state lasers.

Other objects of the invention will, in part, appear hereinafter and, in part, be obvious when the following detailed description is read.

SUMMARY OF THE INVENTION

The invention comprises a system for coupling laser diodes to fiber waveguides. The system includes a cylindrical biaspheric magnifying lens having a diameter substantially larger than either the laser diodes or the optical fiber waveguides. The biaspheric lens focuses the light from the diodes onto a substantial portion of the ends of the fiber waveguides.

The terms "aspheric" and "biaspheric" are used herein in the sense that the lens cross-sectional surface in planes transverse to its cylindrical axis are aconic (i.e., not circular, elliptical, hyperbolic, nor any conic section). The term "aspheric" is used here in a more limited sense. Described otherwise, the biaspheric cylindrical lens as used here has two surfaces whose cross-sections follow paths other than those of conic sections. For simplicity, these sections are also called "aconic-sections".

More specifically, according to the invention, the lens comprises a transparent material with two surfaces each defined by a straight line moving parallel to an axis along respective curves other than conic-section curves.

According to an aspect of the invention both surfaces together cooperate to correct for coma and other off-axis abberations but neither surface alone corrects for these.

According to another feature of the invention, the on-axis aberrations are balanced off against the off-axis aberrations to provide a correction over a wide field.

According to another feature of the invention, the cylindrical lens includes integral stiffening extensions at the portions between the cylindrical surfaces.

According to still another feature of the invention, the stiffening extensions project transversely relative to a plane separating the cylindrical surfaces.

According to yet another feature of the invention, the stiffening extensions project along a plane separating the cylindrical surfaces.

According to still another feature of the invention, the stiffening extensions project both transverse to and parallel to a plane separating the cylindrical surfaces.

According to another feature of the invention a laser light generating system includes a biaspheric, cylindrical lens, i.e., one whose cross-sectional shapes follow paths other than conic sections, for coupling light from an aligned plurality of laser diode sources to a plurality of optical fiber waveguides having ends aligned with the sources.

According to another feature of the invention, a method of forming the cylindrical lens comprises shaping a biaspheric cylindrical lens block at a scale larger than the desired dimensions of the lens and afterwards drawing down the block to the desired dimensions of the lens, preferably at a scale of 50 to 1.

According to another aspect of the invention, the biaspheric cylindrical lens images the emitting facets of the laser diode array onto or into the end faces of the optical fiber waveguides by directing the rays from the laser diode arrays so that they converge in an angle smaller than the acceptance angle of the fiber waveguides at their end faces in the same azimuth.

These and other features of the invention are pointed out in the claims. Other objects and advantages will become evident from the following detailed description.

BRIEF DESCRIPTION OF THE DRAWINGS

The principles of the present invention may be clearly understood by considering the following detailed description when read in conjunction with the accompanying drawings wherein.

DETAILED DESCRIPTION OF PREFERRED EMBODIMENTS

Figure 1:
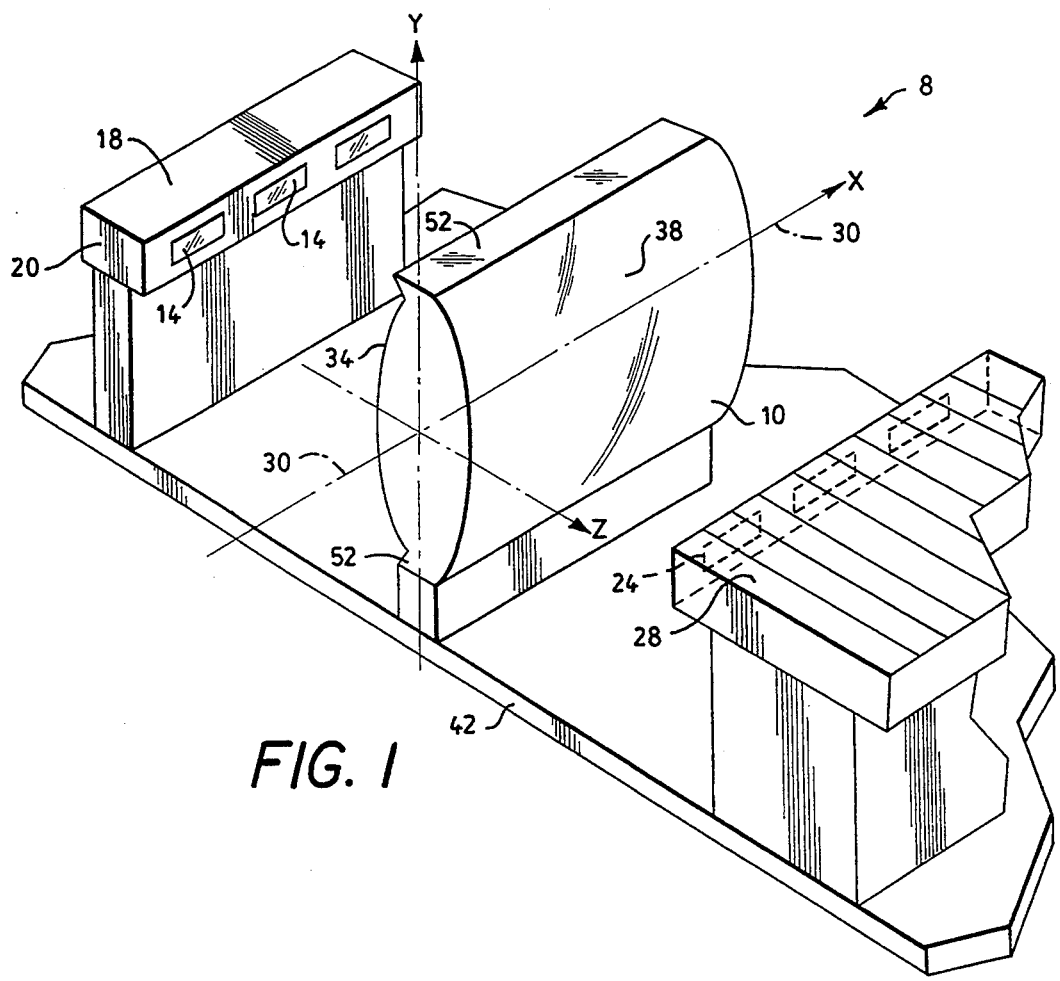
FIG. 1 is a diagrammatic perspective view, with parts broken away, of a laser light coupling system according to the invention using a biaspheric cylindrical lens.
Figure 2:
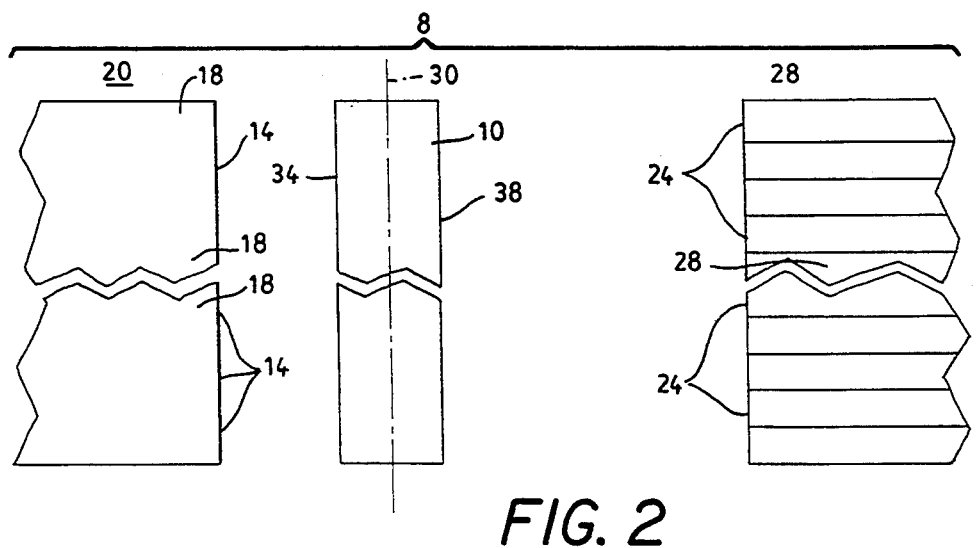
FIG. 2 is a diagrammatic plan view of the system in FIG. 1.
Figure 3:
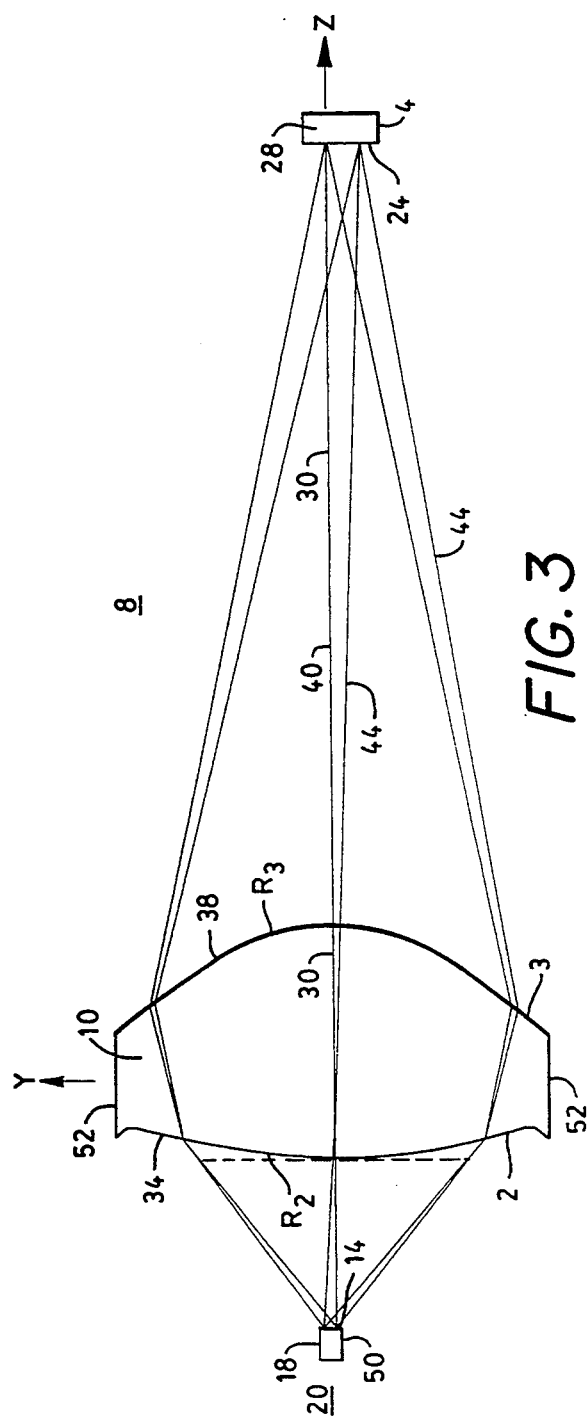
FIG. 3 is a sectional 2 view of the lens of the system of FIGS. 1 and 2 taken in the y-z plane.

FIGS. 1 and 2 show diagrammatic perspective and plan elevational views of a laser pumping system 8 embodying the invention and FIG. 3 shows an elevational view of a lens 10 employed in system 8 and also appearing in FIGS. 1 and 2. These figures are drawn relative to x, y, and z axes of an orthogonal coordinate system as shown. In FIGS. 1, 2, and 3, a biaspheric cylindrical lens 10 couples light emerging from a linear array of adjacent rectangular light emitting facets or ends 14 of adjacent laser diodes 18 on a laser diode array or strip 20 onto respective rectangular receiving ends 24 of a set of an equal number of flat adjacent optical fiber waveguides 28. The diode strip 20 is approximately 100μ wide, and the laser diode emitting facets 14 are approximately 1μ to 2μ high in the y-direction, and approximately 5μ wide in the x-direction. The set of fiber waveguides 28 measured along the receiving ends 24 is also approximately 100μ wide, and the receiving end dimensions are approximately 5μ to 15μ high in the y-direction and 5μ wide in the x-direction.

The lens 10 extends along an axis 30 coincident with the x-axis and preferably parallel within acceptable limits to the direction of the alignment of the centers of the adjacent laser diode emitting ends 14 and centers of the adjacent optical fiber waveguide receiving ends 24. A front surface 34 and a back surface 38 of the lens 10 run generally parallel to the x-axis 30. The surfaces 34 and 38 are aspheric in the y-z plane transverse to the x-axis 30. That is, the aspheric surfaces 34 and 38 are each defined by a line extending parallel to the x-axis 30 and travelling along a curved aconic path understanding that an "aconic" path is one other than the path of a conic section. The cross-sections of the surfaces 34 and 38 serve to limit spherical aberration, coma, and off-axis aberrations as the lens 10 directs the light emerging from the ends 14 so that it converges onto or in the ends 24.

Preferably, the centers of the entrance ends 24, the x-axis, and the centers of the emitting facets 14 all lie in the x-z plane. For this purpose, a suitable support 44, shown only diagrammatically, holds the lens 10, the strip 20, and the fiber waveguides 28 relative to each other in a wellknown manner.

FIG. 3 is an enlarged diagrammatic elevational view of the lens in FIGS. 1 and 2 showing light rays 46 emerging from a typical laser diode emitting end 14, undergoing refraction at the surfaces 34 and 38 of the lens 10, and entering a typical receiving end 24 of the fiber waveguides 28. The lens 10 in the embodiment illustrated in FIGS. 1, 2, and 3 is substantially larger in the direction of the vertical y-axis than either the diode ends 14 or the receiving ends 24 of the fiber waveguides 28. This simplifies focusing and affords the lens 10 structural rigidity along the direction of the x-axis 30 to limit the lens from sagging in the x-y plane.

The lens 10 also includes flanges 52 at the top and bottom. These add to the rigidity of the lens in the x-y plane by adding to its moment of inertia in the y-z plane.

In general, the lens 10 furnishes an approximately 3 to 1 magnification to converge the light emerging from the ends 14, which are approximately 1μ to 2μ in the vertical direction, onto or into the fiber waveguide receiving ends 24, which are 5μ to 10μ high. The lens 10 is well-corrected not only on-axis, but off-axis as well, as measured in the y-z plane.

Further details of a more specific embodiment of the invention appear in the following table where, as best shown in FIG. 3, a distance THO represents the axial distance from the laser diode ends 14 to the aspheric surface 34 (measuring along the z-axis); a distance TH1 represents the axial thickness of the lens 10 along the z-axis; a distance TH2 represents the axial distance from the aspheric surface 38 to the receiving ends 24 of the fiber waveguides 28 along the z-axis; the radius $R_1$ is the base radius of the surface 34 in the y-z plane, transverse to the x-axis 30; the radius $R_2$ is the base radius of the surface 38 in the y-z plane, transverse to the x-axis; EFL is the effective focal length of the lens the back focal length is BFL; the transverse magnification in the y-z plane is T-MAG; n is the refractive index of the material of the lens 10; and F/# is the F-number of the lens 10 in the y-z plane. A positive radius has its center of curvature to the right of the surface, and a negative radius has its center of curvature to the left of the surface. The reference object height is REF OBJ HT; the reference aperture height is REF AP HT; the length from the ends 14 to the ends 24 is LENGTH. All distances are measured in mm.

The conic constant of surfaces 34 and 38 is K.

The shape of the aspheric surface in the y-z plane is expressed by the following:

$$z = \frac{cy^2}{1 + \sqrt{1 - (K + 1)c^2y^2}} + Ay^4 + By^6 + Cy^8 + Dy^{10} + Ey^{12} + Fy^{14} + Gy^{16} \tag{1}$$

where K is the conic constant, c is the curvature 1/R, with R the radius, at the pole of the surface, y and z are measured from local coordinate systems having their origins at the pole of the surfaces; A, B, C, D, E, F, and G are 4th, 6th, 8th, 10th, 12th, 14th, and 16th order coefficients for the surface.

In a specific embodiment, the following values apply:
TH0 = 0.071 mm
TH2 = 0.331 mm
TH1 = 0.098 mm
$R_1$ = 0.206 mm
$R_2$ = −0.087 mm
n = 1.830
EFL = 0.087 mm
BFL = 0.331 mm
T-MAG = −3.030 mm
F/# = 1.820
REF OBJ HT = 0.005 mm
REF AP HT = 0.059 mm
LENGTH = 0.500 mm The coefficients in the equation above, for the surface 34 are:
K = −13.7971
A = −1.20030E+02, 4th order coefficient
B = 5.04869E+04, 6th order coefficient
C = −2.41203E+07, 8th order coefficient
D = 7.68848E+09, 10th order coefficient
E = −1.176771000E+12, 12th order coefficient
F = 8.924943727E+13, 14th order coefficient
G = −3.058562317E+15, 16th order coefficient The aspheric polynomial data for the surface 38 are:
K = −1.83326
A = −1.38769E+02, 4th order coefficient
B = 1.05988E+04, 6th order coefficient
C = −7.64537E+05, 8th order coefficient
D = 2.06031E+08 10th order coefficient
E = −1.205466504E+11, 12th order coefficient
F = 2.591516650E+13, 14th order coefficient
G = −1.553182640E+15, 16th order coefficient The above data is for a wavelength of 1.06 micrometers.

These relationships result in a well-corrected lens not only on-axis but also off-axis in the y-z plane.

Figure 4:
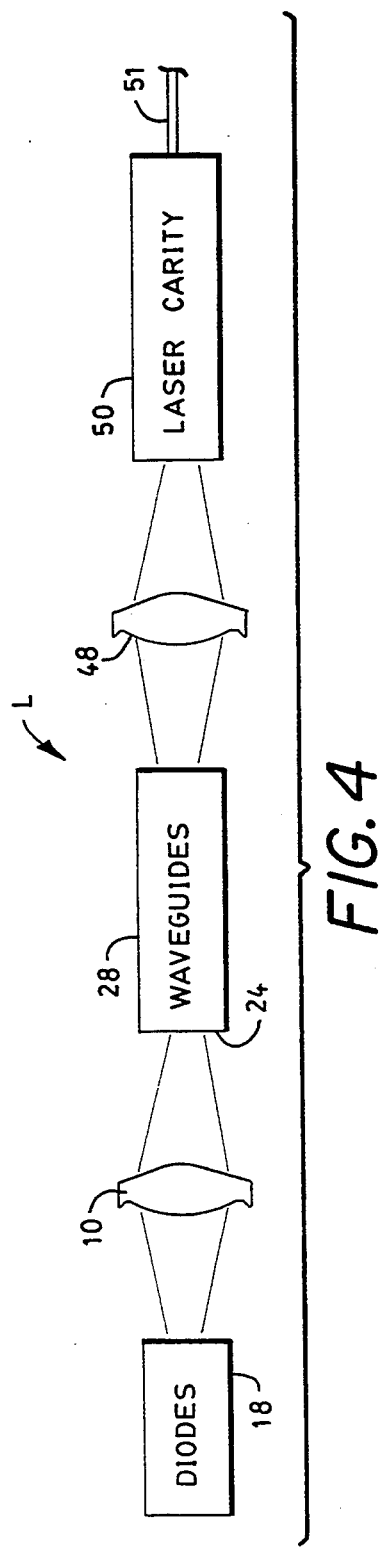
FIG. 4 is a diagrammatic representation of a laser system using the coupling system including the biaspheric cylindrical lens of FIGS. 1, 2, and 3.

FIG. 4 illustrates a laser system L including the system 8 of FIGS. 1 to 3 embodying the invention. Here, the lens 10 converges light from the diodes 18 onto the ends 24 of fiber waveguides 28. The latter form a bundle at their distal, i.e. emitting, ends. Suitable optics 48, such as a lens converges the output of the fiber waveguides 28 into a solid state laser cavity 50 which in a known manner produces a laser beam 51. Such a laser L is disclosed in the concurrently filed and commonly assigned application of Hong Po and Stephen D. Fantone and entitled "Optical Fiber Laser and Geometric Coupler." In operation, the diodes 18 generate light, and the lens 10 focuses the light on or into the receiving ends 24 of the fiber waveguides 28. The light is guided to the emitting ends of the waveguides 28. The optics 48 converge the output of the fiber waveguides 28 into the solid state laser cavity 50. The latter generates a laser beam 51.

Figure 5:
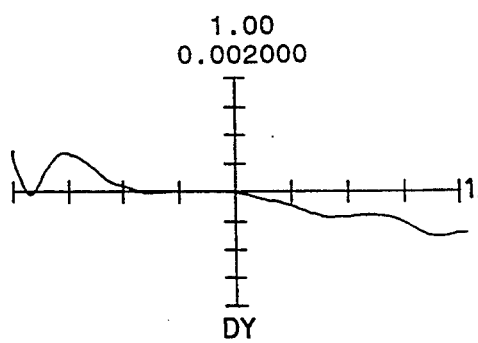
FIGS. 5, 6, and 7 are graphs of the tangential ray displacement errors of the biaspheric cylindrical lens in FIGS. 1 to 3 for different angular field positions with the full field at 1.0.
Figure 6:
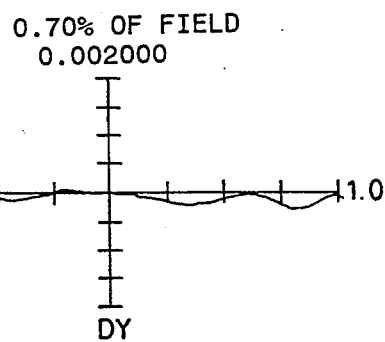
Figure 7:
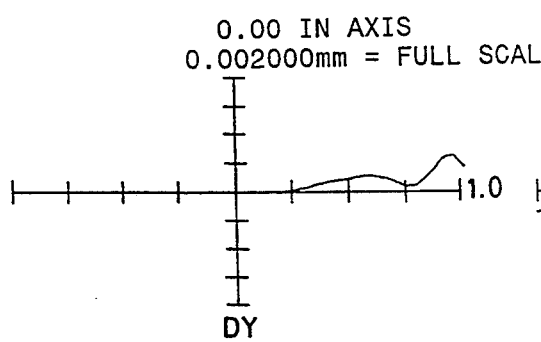
Figure 8:
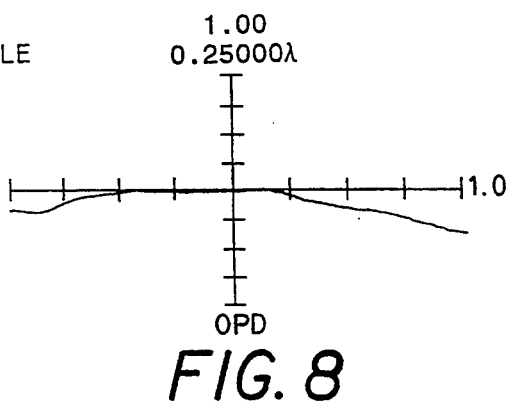
FIGS. 8, 9, and 10 are graphs of the tangential and sagittal optical path differences of the biaspheric cylindrical lens in FIGS. 1 to 3, again as a function of field position.
Figure 9:
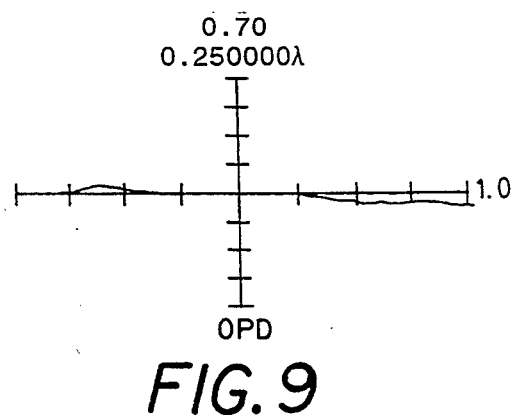
Figure 10:
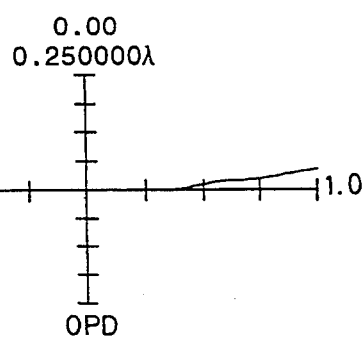

The aberrations of the aforementioned embodiments in the y-z plane appear in the graphs of FIGS. 5 to 10. In each graph, the maximum entrance pupil coordinate is normalized to 1.0. The horizontal axis represents the entrance pupil and the vertical axis represents the amount of aberration. FIGS. 5, 6, and 7 are graphs of the tangential ray displacement errors of the biaspheric cylindrical lens in FIGS. 1 to 3 for different decimal fractions of the full field, namely 1.00, 0.70, and 0.00.

The lens images the light outputs of laser diode arrays onto the end faces of the optical fiber waveguides. More generally, the lens 10 converges the rays from the laser diodes 18 onto the end faces 24 of the fiber waveguides 28 so the rays are channeled into an angle smaller than the acceptance angles of waveguides at their end faces 24. The acceptance semifield angle in air is equal to:

$$\theta = \sin^{-1}(NA) \quad (2)$$

where NA=the numerical aperture of the optical fiber waveguide in the direction transverse to its width.

The lens 10 corrects for coma and off-axis aberrations in a distinctive way. Specifically, each surface 34 and 38 is not individually corrected, but the combination of the two surfaces is. In the lens 10, the overall system is corrected for off-axis aberrations, especially coma, regardless of the correction of the individual surfaces, and the on-axis aberrations are balanced off against the off-axis aberrations to obtain a better correction over a wide field. In the embodiment disclosed, the lens 10 uses its 16th order polynomial to obtain this desired correction. According to other embodiments of the invention, the lens 10 may be constructed with higher or lower ordered polynomials, depending on the desired numerical aperture.

Figures 11, 12:
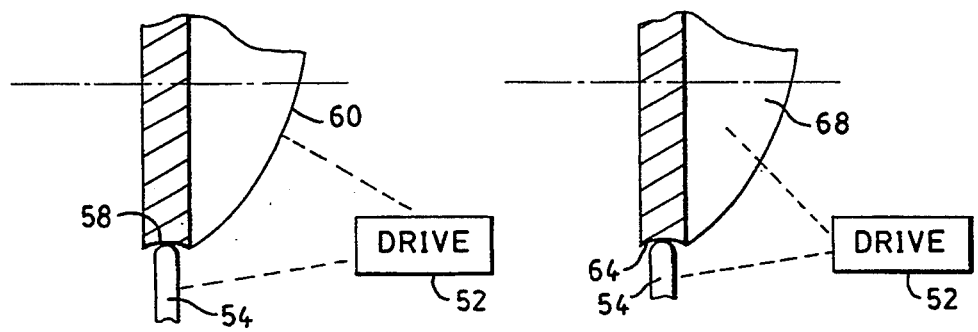
FIGS. 11 and 12 are respective diagrammatic perspective views with parts broken away illustrating means for carrying out a step in the method according to the invention and showing numerically controlled machine tools cutting the edges of wheels for in turn, cutting enlarged profiles (50×) of the front and rear aspheric surfaces of the biaspheric lens in FIGS. 1 to 3.

The process of making the lens 10 appears in FIGS. 11 to 16. It involves forming a larger preform block from the material comprising the lens 10. The larger block is identical in geometry to the lens 10, but on a 50× enlarged scale. The manufacture starts by shaping grinding wheels as shown in the views of FIGS. 11 and 12. In FIG. 11, a drive 52 numerically controls a tool bit 54 which cuts into edge 58 of a rotating 8 inch diameter steel wheel 60. The drive 54 rotates the wheel 60 and moves the tool 54, radially and axially, relative to the axis of the wheel 60 to give the edge 58 a cross-sectional shape nearly complementary to the cross-sectional profile of the surface 34 of the lens 10, but on a 50× enlarged scale. Sufficient room is left on the edge 58 so that a later plating step brings the edge to a cross-sectional profile more exactly complementary to the surface 34 on the 50× scale. The cut is repeated on another round steel blank to produce a second wheel 60 like the first steel wheel 60.

In FIG. 12, the drive 52 rotates another 8 inch diameter wheel 68 and moves the tool 54, axially and radially, relative to the axis of the wheel 68 to provide its edge with a shape nearly complementary to the 50× enlarged axially transverse cross-sectional profile of the second surface 38 of the lens 10. Sufficient room is left on the edge 68 so that a later plating step brings the edge to a cross-sectional profile more exactly complementary to the surface 38 on the 50× scale. The drive 52 and tool 54 repeat the process to form a second wheel 68 like first wheel 68.

A plater, not shown, then plates the edge 58 of one wheel 60 and the edge 64 of one wheel 68 with coarse diamond particles. In the plated condition, the cross-sections of the wheels are ideally exactly complementary to the surfaces 34 and 38 on an enlarged 50× scale. To simplify the grinding process, the plater also plates the outer peripheral side surfaces of the wheels 60 and 68. The plater then plates the edges 58 and 64 of the other wheels 60 and 68 and the outer peripheries of the side surfaces of these wheels with fine diamond particles. In the plated condition, the cross-sections of the wheels are also ideally exactly complementary to the surfaces 34 and 38 on an enlarged 50×scale. Plating converts one of each of the wheels 60 and 68 to a coarse grinding wheel, and the other of each of the wheels 60 and 68 to a fine grinding wheel.

Figure 13:
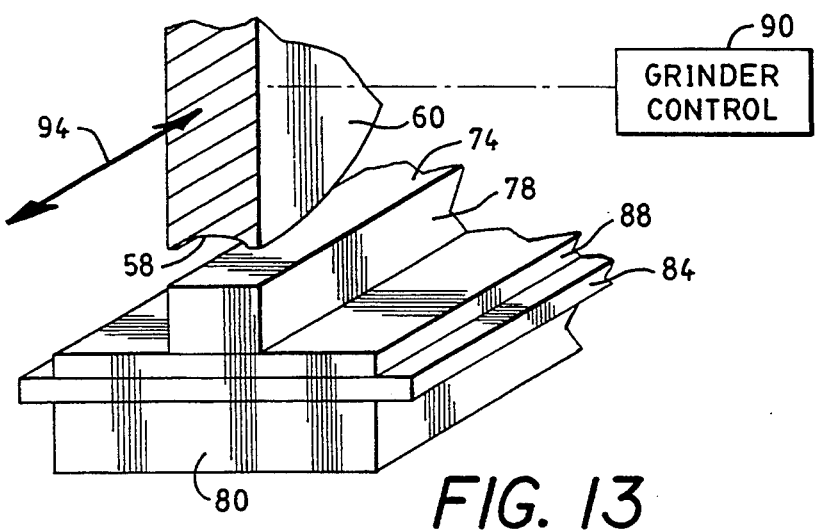
FIGS. 13 and 14 are respective diagrammatic perspective views with parts broken away illustrating means for carrying out a step in the method according to the invention and showing, a diamond plated wheel edge grinding an aspheric surface as a cylindrical glass block.
Figure 14:
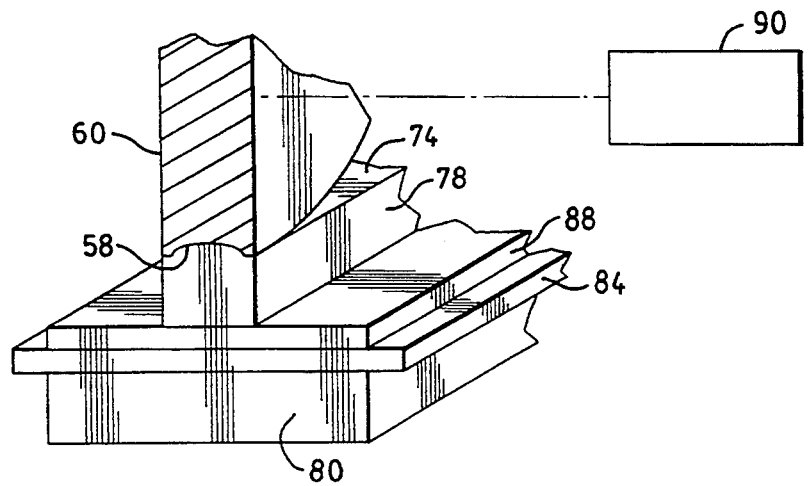

The pairs of grinding wheels 60 and 68 then form a 50× enlargement of the lens 10. FIGS. 13 and 14 are respective sectional and perspective views illustrating the next steps for this purpose. In FIGS. 13 and 14, the coarse diamond plated surface 58 of the wheel 60 grinds an aspheric cylindrical surface 74, corresponding to the surface 34, on a 50× scale onto a rectangular glass perform block 78. The fine wheel 60 then grinds the surface 74 to provide it with a fine finish.

To accomplish the grinding operation of the wheel 60, a magnetic chuck 80 in FIGS. 13 and 14 forms part of a surface grinder and holds a steel plate 84. Waxed to the plate 84 is a glass plate 88. The latter carries the rectangular block 78 which is waxed to the plate 88. The block 78 is of the same material as the lens 10, and its width is 50 times the width of the lens 10 in the x-y plane between the surfaces 34 and 38 and across the cylindrical x-axis. A grinder control 90 rotates the coarse wheel 60 and moves it in and out of the paper in the directions of the double headed arrow 94. The grinding operation takes place twice, once with the coarse wheel 60 and then with the fine wheel 60.

The process continues by lapping the surface 74. Lapping wheels are fashioned as shown in FIGS. 11 and 12 with a numerically controlled drive 52. The wheels are treated and then moved by the grinder control 90 as shown in FIG. 13 to lap the surface 74 on the block 78. In an embodiment of the invention, the lapping step is omitted.

Figure 15:
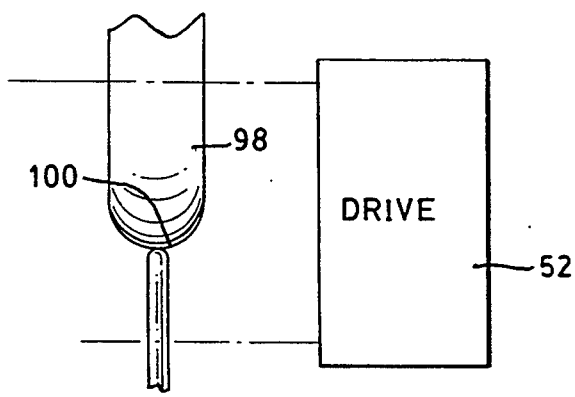
FIG. 15 is a diagrammatic perspective view with parts broken away of means for carrying out a step in the method according to the invention and showing a numerically controlled machine tool cutting the edges of a wheel with a 50× enlarged profile of the front aspheric surface of the biaspheric lens in FIGS. 1 to 3.
Figure 16:
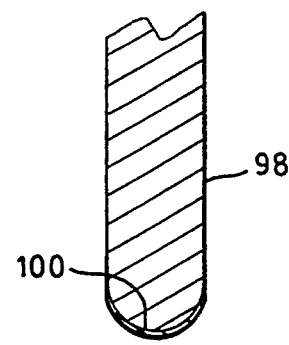
FIG. 16 is diagrammatic sectional view of part of a wheel in FIG. 15.

In FIG. 15, the numerically controlled drive 52 fashions the edge of one of two grinding wheels 98 to cross-sectional profiles nearly the shape of the surface 34 on a 50× enlarged scale. A plater then forms coarse and fine Wheels by diamond plating the respective edges so their cross-sectional profiles each ideally conforms exactly to the transverse cross-section of the surface 34. FIG. 16 shows a plated wheel 98 with the ideally exact cross-sectional profile 100 of the surface 34.

Figure 17:
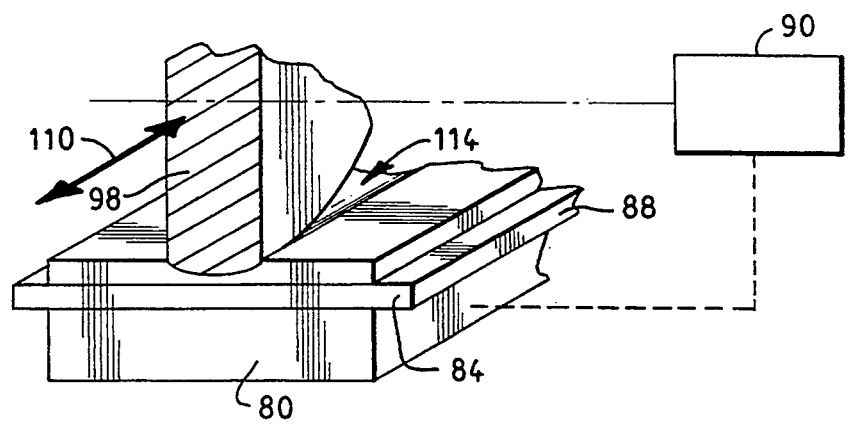
FIG. 17 is a diagrammatic perspective view with parts broken away of means for carrying out a step in the method according to the invention and showing a grinding arrangement for cutting a groove for receiving a 50× enlarged shape corresponding to a surface of the lens in FIGS. 1 to 3.
Figure 18:
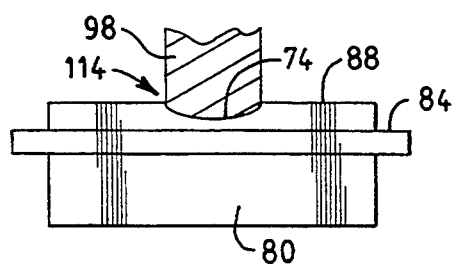
FIG. 18 is a diagrammatic elevational view with parts broken away of means for carrying out a step in the method according to the invention showing a block having an enlarged surface corresponding to a surface of the lens in FIGS. 1 to 3 and sitting in the groove formed by the arrangement in FIG. 21.

The block 78 is then removed from the glass plate 88. FIG. 17 shows the next step. Here, the control 90 rotates the wheel 98 of FIGS. 15 and 16, and moves it back and forth into and out of the direction of the paper, as shown by the double headed arrow 110, and downwardly to form a groove 114 in the plate 88. The control 90 first uses the coarse grinding wheel 98 and then the fine grinding wheel. The groove 114 now is ready to receive a shape corresponding to the surface 34 of the lens 10 enlarged on a 50×scale. In the sectional view of FIG. 18, the block 88 has its enlarged surface 74, corresponding to the surface 34 of the lens 10, fitted into the groove 114 formed by the arrangement in FIG. 17. The plate 88 containing the groove 114 remains waxed to the steel plate 84 on the magnetic chuck 80 of the surface grinder. Going from FIG. 14 to 19 involves flipping over the block 78 and seating the block in the groove 114. Because the surface 74 and the groove 114 are aspheric, everything lines up. No roll need be accommodated. It is now possible to grind the back surface directly on the block 78.

Figure 19:
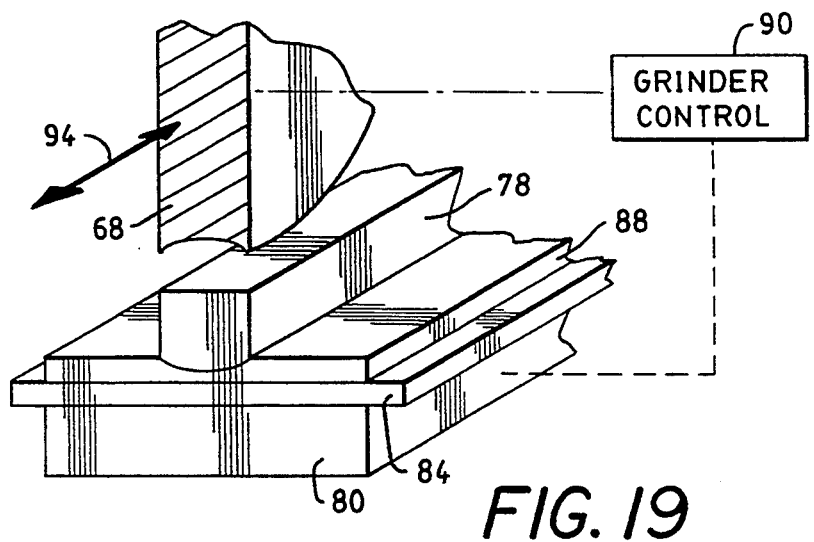
FIG. 19 is a diagrammatic perspective and partially schematic view with parts broken away of means for carrying out a step in the method according to the invention and showing a grinding system which uses a grinding wheel having a cross-section complementary to the other surface of the biaspheric lens in FIGS. 1 to 3 on a 50×scale for grinding the other surface of the block in FIG. 18.

The lens formation continues as shown in FIG. 19. The latter is a perspective and partially schematic view of the grinding system. Here, the grinder control 90 rotates the grinding wheel 68. The latter has a cross-section complementary to the shape of the surface 38 in the biaspheric lens 10 on a 50× scale. The grinder control 90 turns the wheel 68 and moves it back and forth in the directions of the double headed arrow 94 and downwardly against the block 78.

Figure 20:
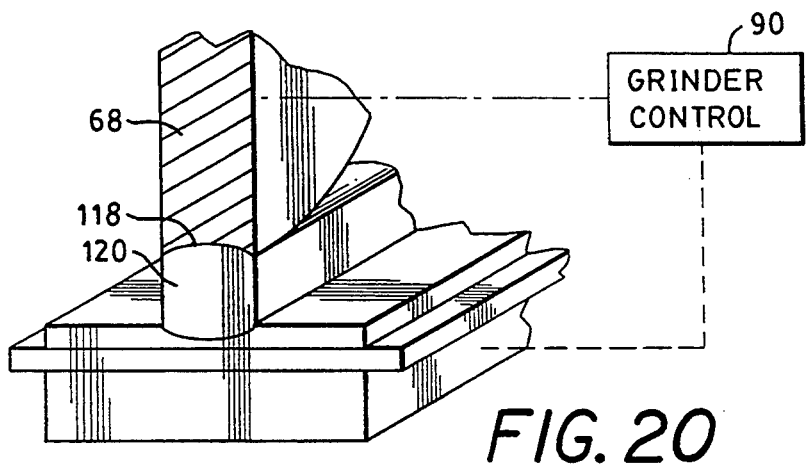
FIG. 20 is a diagrammtic perspective and partially schematic view with parts broken away of means for carrying out a step in the method according to the invention and showing the grinding system of FIG. 19 grinding the other surface of the block in FIG. 19.

The grinding operation continues as shown in the perspective and partially schematic view of the grinding system of FIG. 20. The grinder first uses the coarse wheel 68, then the fine wheel 68, and finally a lapping wheel which received its shape as shown in FIG. 12. Additional polishing may also be used to further improve the surface quality. An oil or water base coolant may be used to cool the surfaces during any or all the grinding and machining operations.

Figure 21:
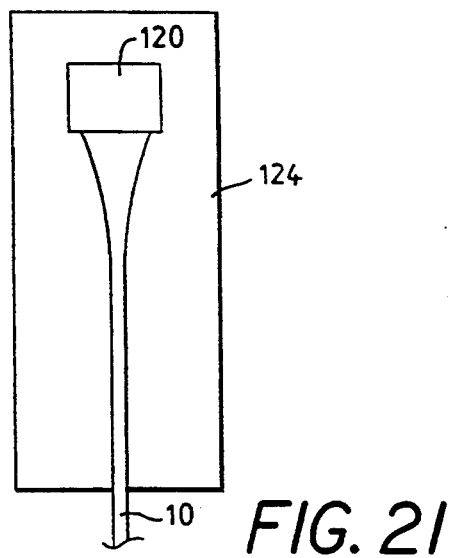
FIG. 21 is a diagrammatic illustration showing means for carrying out a step in the method according to the invention and showing a drawing furnace for drawing down the lens shaped block in FIGS. 17 and 18 into a lens of smaller scale reduced in size by 50 to 1.

The result is the preform block 78 having the shape of a lens identical to the lens 10 but on an enlarged 50×scale. The process continues by drawing the lens down to the dimensions of the lens 10. FIG. 21 is a schematic illustration showing a drawing furnace 124 for drawing the lens shape block 120 into the lens 10.

The drawing furnace uses a careful selection of temperatures, preferably lower, and rates that accurately maintain the profile of the lens formed from the block 78. Because the lens grinding process is extremely accurate, with or without lapping, the result in surface errors is less than a fraction of a micron.

Figure 22:
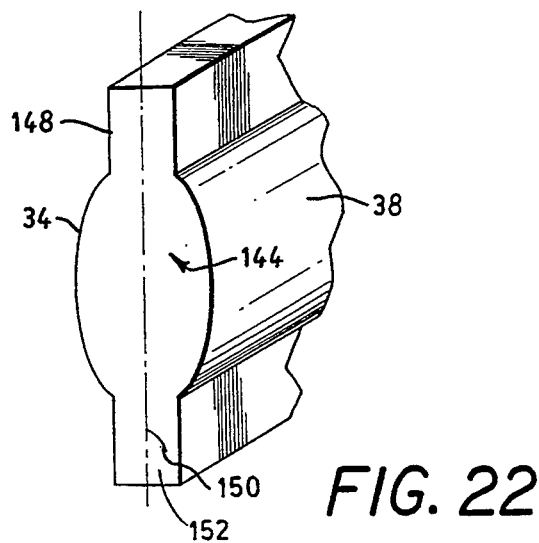
FIG. 22 is a diagrammatic perspective view of a portion of another lens embodying the invention and having cylindrical refracting surfaces shaped and spaced identically to the lens of FIG. 1, but with stiffening extensions between the cylindrical surfaces.

FIG. 22 is a perspective view of a lens 144 embodying the invention and also having surfaces 34 and 38 shaped and spaced identical to those of lens 10. Here, integral stiffening extensions 148 and 150, between the cylindrical surfaces 34 and 38 project along the x-y plane, i.e., a plane 152, between the surfaces 34 and 38. These extensions 148 and 150 serve to stiffen the lens, so the lens 144, when mounted between the laser strip 20 and aligned ends 24 of the fiber waveguides 28, does not droop or sag in the x-y plane.

Figure 23:
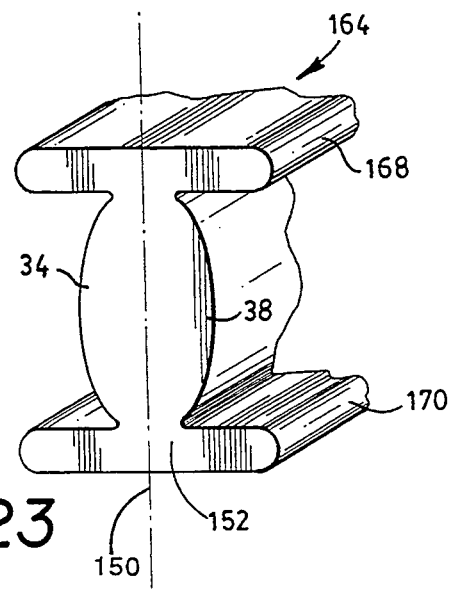
FIG. 23 is a diagrammatic perspective view of part of yet another lens embodying the invention and having refracting surfaces shaped and spaced identically to the lens of FIG. 1, but with integral stiffening extensions.

FIG. 23 is a perspective view of a lens 164 embodying the invention, and also having surfaces 34 and 38 shaped identically to those of lens 10. Here, there are integral stiffening extensions 168 and 170 extending between and beyond the plane 150. These extensions also stiffen the lens.

Figure 24:
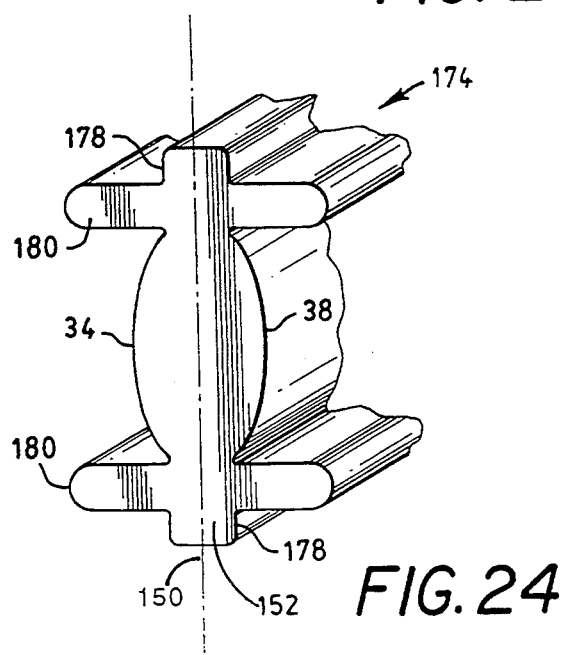
FIG. 24 is a diagrammatic perspective view of part of another lens embodying the invention with refracting surfaces corresponding to the lens of FIGS. 1, 2, and 3, with other stiffening extensions.

FIG. 24 is a perspective view of another lens 174 embodying the invention and having surfaces 34 and 38 corresponding to those of the lens 10. Here, stiffening extensions 178 and 180 extend beyond and between the cylindrical surfaces 34 and 38 and project parallel to the plane 150. These extensions 178 and 180 serve to stiffen the lens 174 in the same manner as the other aforementioned stiffeners by increasing the cross-sectional moment-of-inertia of the lens in the y-z plane.

The lenses in FIGS. 22, 23, and 24 are manufactured from forms at a 50× scale in the manner shown in FIGS. 11 to 16. However, the lapping and grinding wheels are shaped to cut the form with the extensions. The extensions 148, 150, 168, 170, 178, and 180 are each tapered and have rounded corners for easy manufacture.

Figure 25:
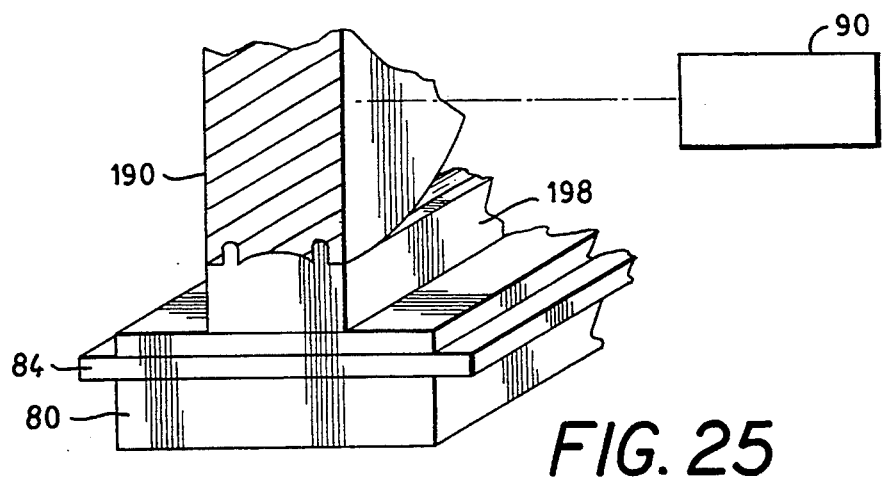
FIG. 25 is a diagrammatic perspective view with parts broken away showing a grinding wheel arrangement shaping one side of the lens of FIG. 24.
Figure 26:
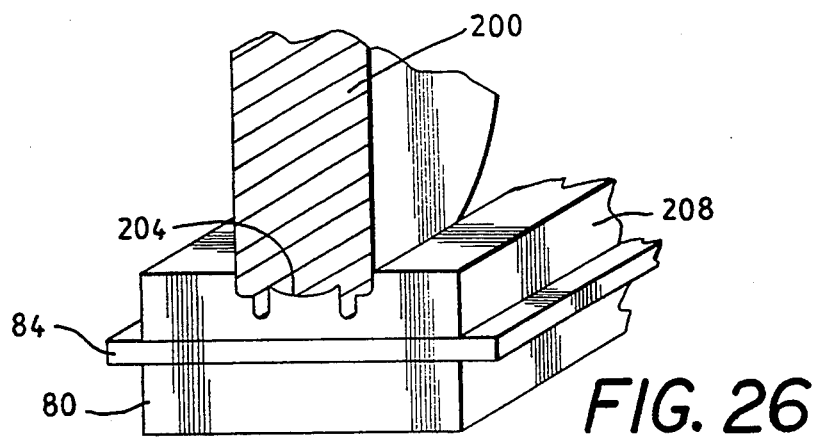
FIG. 26 is a diagrammatic perspective view with parts broken away showing formation of a groove to receive the ground side of the lens in FIG. 29.
Figure 27:
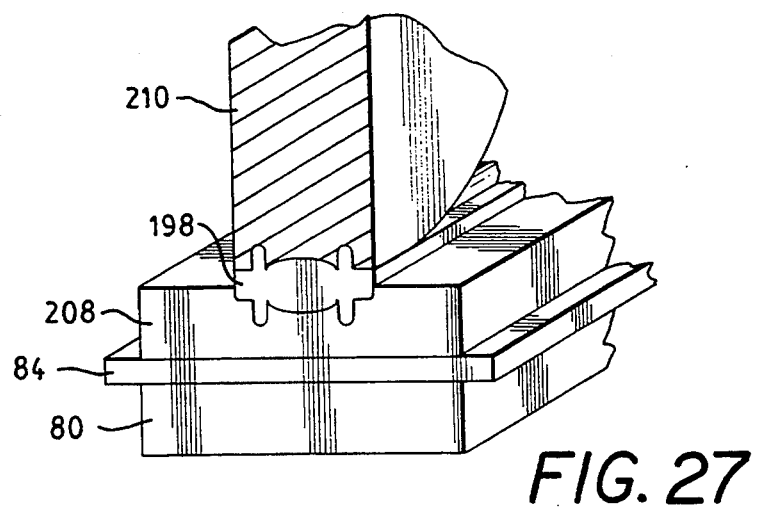
FIG. 27 is a diagrammatic perspective view with parts broken away showing formation of the other refractive surface of the lens in FIG. 21.

FIG. 25 corresponds to FIG. 14 wherein a grinding wheel 190, having a shape complementary to the surface 34 and the extensions 178 and 180, grinds a block 198 to the proper shape. In FIG. 26, a wheel 200 cuts a groove 204 with extensions into a slab 208 in a manner similar to that shown in FIG. 17. A wheel 210 in FIG. 27 then grinds the block 198 in a manner similar to that in FIG. 20. The newly ground surface corresponds on a 50× scale to the surface 38 with the extensions corresponding to 152 and 168 in FIG. 23. This arrangement and process forms the block of glass having the correct index of refraction to a shape corresponding to the desired lens 164 in FIG. 23. A drawing furnace and tower then draws the block 198 axially down at a 50 to 1 reduction in the shape of the lens 198.

What has been shown is how to fabricate a lens that is relatively insensitive to tilt and forms a small enough image of a laser diode facet on the available area of a corresponding entrance end of a receiving fiber so that the overall optical coupling between them is relatively insensitive to small lateral displacements between the relative positions of the laser diode array and receiving fiber bundle.

Although particular embodiments of the present invention have been shown and described herein, many varied embodiments incorporating the teachings of the present invention may be easily constructed by those skilled in the art.

What is claimed is:

1. A cylindrical optical fiber lens comprising a transparent material elongated in a given direction, said material having two refractive surfaces elongated in said given direction with each having continuous curvatures in planes transverse to said given direction wherein each of said curvatures is aspheric and non-conic.

2. The cylindrical lens of claim 1 wherein said material defines an axis along its elongated direction and said surfaces are parallel thereto.

3. The cylindrical lens of claim 2 wherein said surfaces jointly correct on- and off-axis aberrations.

4. The cylindrical lens of claim 2 wherein said surfaces correct for third and higher order coma and on- and other off-axis aberrations.

5. The cylindrical lens of claim 4 wherein said surfaces jointly act to correct for coma.

6. The cylindrical lens of claim 1 wherein said surfaces are each defined by a straight line parallel to the axis and moving along a path other than that of a conic surface.

7. The lens of claim 1 wherein said material includes stiffening means for stiffening the lens, said stiffening means including integral extensions projecting from between the surfaces.

8. The lens of claim 7 wherein said stiffening means project in a direction along a plane between said surfaces.

9. The lens of claim 7 wherein said stiffening means also project away from said plane between said surfaces.

10. The lens of claim 7 wherein said stiffening means project along and transverse to a plane between said surfaces.

11. The lens of claim wherein the curvatures of said surfaces are in a z-y plane perpendicular to the longitudinal axis of said lens expressed by $$z = \frac{cy^2}{1 + \sqrt{1 - (K+1)c^2y^2}} + Ay^4 + By^6 + Cy^8 + Dy^{10} + Ey^{12} + Fy^{14} + Gy^{16} \quad (3)$$

where K is the conic constant;
c is the curvature $1/R$, with R the radius, at the pole of the surface;
A, B, C, D, E, F, and G are 4th, 6th, 8th, 10th, 12th, 14th, and 16th order coefficients.

12. A cylindrical optical fiber lens comprising a transparent material elongated in a given direction, said material having two refractive surfaces elongated in said given direction with each having continuous curvatures in planes transverse to said given direction wherein each of said curvatures is aspheric and non-conic, said material defining an axis along its elongated direction and said surfaces being parallel thereto, the curvatures of said surfaces bing in a z-y plane perpendicular to the longitudinal axis of said lens expressed by:

$$z = \frac{cy^2}{1 + \sqrt{1 - (K+1)c^2y^2}} + Ay^4 + By^6 + Cy^8 + Dy^{10} + Ey^{12} + Fy^{14} + Gy^{16}$$

where K is the conic constant;
c is the curvature $1/R$, with R the radius, at the pole of the surface;
A, B, C, D, E, F, and G are 4th, 6th, 8th, 10th, 12th, 14th, and 16th order coefficients, and wherein a distance TH2 represents the axial thickness of the lens; radius $R_1$ is the radius of the first surface from its pole; a radius $R_2$ is the radius of the second surface from its pole; EFL is the effective focal length of the lens; the back focal length is BFL; the transverse magnification is T-MAG; n is the refractive index of the material of the lens; and F/# is the F-number of the lens; the reference object height is REF OBJ HT; the reference aperture height is REF AP HT; the length from an object to an image is LENGTH; a positive radius has its center of curvature to the fight of the surface, a negative radius has its center of curvature to the left of the surface, where:

TH0 = 0.071 mm
TH2 = 0.331 mm
TH1 = 0.098 mm
$R_1$ = 0.206 mm
$R_2$ = −0.087 mm
n = 1.830
EFL = 0.087 mm
BFL = 0.331 mm
T-MAG = −3.030 mm
F/# = 1.820
REF OBJ HT = 0.005 mm
REF AP HT = 0.059 mm
LENGTH = 0.500 mm wherein the aspheric polynomial data for coefficients in the aforementioned equation for the first surface are:

K = −13.7971
A = −1.20030E+02, 4th order coefficient
B = 5.04869E+04, 6th order coefficient
C = −2.41203E+07, 8th order coefficient
D = 7.68848E+09, 10th order coefficient
E = −1.176771000E+12, 12th order coefficient
F = 8.924943727E+13, 14th order coefficient
G = −3.058562317E+15, 16th order coefficient and wherein aspheric polynomial data for the second surface are:

K = −1.83326
A = −1.38769E+02, 4th order coefficient
B = 1.05988E+04, 6th order coefficient
C = −7.64537E+05, 8th order coefficient
D = 2.06031E+08 10th order coefficient
E = −1.205466504E+11, 12th order coefficient
F = 2.591516650E+13, 14th order coefficient
G = −1.553182640E+15, 16th order coefficient The above data is for a wavelength of 1.06 micrometers.

* * * * *